United States Patent
Chen et al.

(10) Patent No.: US 11,575,427 B2
(45) Date of Patent: Feb. 7, 2023

(54) CONFIGURATION SIGNALING EXECUTION CONTROL METHOD AND APPARATUS, AND DEVICE, SYSTEM AND STORAGE MEDIUM

(71) Applicant: ZTE CORPORATION, Shenzhen (CN)

(72) Inventors: Yijian Chen, Shenzhen (CN); Zhaohua Lu, Shenzhen (CN); Bo Gao, Shenzhen (CN); Shujuan Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 29 days.

(21) Appl. No.: 17/278,513

(22) PCT Filed: Sep. 20, 2019

(86) PCT No.: PCT/CN2019/107038
§ 371 (c)(1),
(2) Date: Mar. 22, 2021

(87) PCT Pub. No.: WO2020/057642
PCT Pub. Date: Mar. 26, 2020

(65) Prior Publication Data
US 2022/0038167 A1      Feb. 3, 2022

(30) Foreign Application Priority Data
Sep. 21, 2018   (CN) .......................... 201811105879.0

(51) Int. Cl.
*H04B 7/08*     (2006.01)
*H04W 36/06*    (2009.01)
(Continued)

(52) U.S. Cl.
CPC ............ *H04B 7/088* (2013.01); *H04W 36/06* (2013.01); *H04W 72/044* (2013.01);
(Continued)

(58) Field of Classification Search
CPC ..... H04B 7/088; H04B 7/0695; H04W 36/06; H04W 72/044; H04W 74/0841;
(Continued)

(56) References Cited

U.S. PATENT DOCUMENTS

2018/0227899 A1     8/2018  Yu et al.
2020/0296576 A1*    9/2020  Ouchi ..................... H04L 5/001
(Continued)

FOREIGN PATENT DOCUMENTS

| | | |
|---|---|---|
| CN | 107612602 A | 1/2018 |
| CN | 108093481 A | 5/2018 |

(Continued)

OTHER PUBLICATIONS

International Search Report Form PCT/ISA/210, and Written Opinion Form PCT/ISA/237, International Application No. PCT/CN2019/107038, pp. 1-5 International Filing Date Sep. 20, 2019 mailing date of search report dated Dec. 18, 2019.

(Continued)

*Primary Examiner* — Harry H Kim
(74) *Attorney, Agent, or Firm* — George McGuire

(57) ABSTRACT

Provided are a configuration signaling execution control method and apparatus, a device, a system and a storage medium. The method includes: in a beam recovery process and in a case of receiving configuration signaling, deciding an execution environment of the configuration signaling; and determining an execution policy of the configuration signaling according to a decision result.

15 Claims, 2 Drawing Sheets

S201 — In a beam recovery process and in a case of receiving configuration signaling, decide an execution environment of the configuration signaling S202 — Determine an execution policy of the received configuration signaling according to a decision result S203 — Control the execution of the configuration signaling according to the obtained execution policy

(51) Int. Cl.
  *H04W 72/04* (2009.01)
  *H04W 74/08* (2009.01)
  *H04W 76/19* (2018.01)
  *H04L 5/00* (2006.01)
  *H04B 7/06* (2006.01)

(52) U.S. Cl.
  CPC ... *H04W 74/0841* (2013.01); *H04W 74/0866* (2013.01); *H04W 76/19* (2018.02)

(58) Field of Classification Search
  CPC .. H04W 74/0866; H04W 76/19; H04L 5/001; H04L 5/0098; H04L 5/0053
  See application file for complete search history.

(56) References Cited

U.S. PATENT DOCUMENTS

| | | | |
|---|---|---|---|
| 2020/0367079 A1* | 11/2020 | Chen | H04W 76/19 |
| 2021/0251017 A1* | 8/2021 | Chen | H04W 74/0833 |

FOREIGN PATENT DOCUMENTS

| | | | |
|---|---|---|---|
| CN | 108260214 A | | 7/2018 |
| CN | 110291726 A | | 9/2019 |
| WO | 2014071605 A1 | | 5/2014 |
| WO | 2017024516 A1 | | 2/2017 |

OTHER PUBLICATIONS

VIVO;, "Discussion on the Impact on Beam Failure Recovery;" 3GPP TSG-RAN WG2 NR Ad hoc 1801, R2-1800895;, Jan. 26, 2018 (Jan. 26, 2018), sections 1-3.
Zte et al.; "CR for the Behavior of BFI_Counter and Beam Failure Dedtection Timer During BWP Switch;" 3GPP TSG-RAN WG2 Meeting #10bis, R2-1804875;, Apr. 20, 2018 (Apr. 20, 2018), section 5.17.
CN First Search Report, App. No. 2018111058790, dated Apr. 27, 2022, pp. 1-2.
Translated CN First Search Report, App. No 2018111058790m dated Apr. 27, 2022, pp. 1-1.
CN Office Action, App No. 201811105879.0, dated May 6, 2022, pp. 1-4.
Translated CN Office Action, App No. 20181105879.0, dated May 6, 2022, pp. 1-5.
R2-1802006, Discussion on the impact on beam failure recovery, dated Feb. 26-Mar. 2, 2018, 3GPP TSG-RAN WG2 Meeting #101 in Athens, Greece.
R2-1805442, CR on the beam recovery impact and BWP impact on RLF triggering, dated Apr. 16-20, 2018, 3GPP TSG-WG2 Meeting #101bis in Sanya, P.R. China.
European Search Report, U.S. Appl. No. 19/863,213, dated May 20, 2022, pp. 1-11.
R2-1800160, CATT: BWP for Beam Failure Recovery, Jan. 22-26, 2018, 3GPP TSF-RAN WG2 NR Ad hoc 0118, Vancouver, Canada.

* cited by examiner

CONFIGURATION SIGNALING EXECUTION CONTROL METHOD AND APPARATUS, AND DEVICE, SYSTEM AND STORAGE MEDIUM

CROSS-REFERENCE TO RELATED APPLICATIONS

This is a National Stage Application filed under 35 U.S.C. 371 based on International Patent Application No. PCT/CN2019/107038, filed on Sep. 20, 2019, which claims priority to Chinese Patent Application No. 201811105879.0 filed on Sep. 21, 2018, the disclosures of both of which are incorporated herein by reference in their entireties.

TECHNICAL FIELD

The present application relates to the technical field of communications and, in particular, to a configuration signaling execution control method and apparatus, a device, a system and a storage medium.

BACKGROUND

In the 5th Generation mobile communication system (5G), a 5G base station uses large-scale antenna arrays to form directivity beams through a beam forming technology for communications. In order to ensure obtaining sufficient signal gain, the base station needs to use a large number of narrow beams to ensure that users in any direction in a cell can be effectively covered, that is, the narrower the beam, the greater the signal gain. However, a narrow beam transmission is sensitive to the movement of a user equipment (UE) and the blocking of a beam link. The blocking is especially serious at high frequencies, and thus a beam link failure is often caused. Therefore, when a radio channel changes for the preceding reasons, the UE in the communication system needs to perform a fast beam link recovery with a base station so that good user experience is provided.

According to relevant protocols, in the process of beam link recovery performed by the UE with the base station, In addition to performing a detection on control resources used for receiving a beam recovery response, the UE still needs to detect control resources (such as a physical downlink control channel (PDCCH)) configured for the original beam link that need to be detected and are not cut off. As a result, in the beam recovery process, the UE may receive configuration instructions from the control resources configured for the original beam link, for example, the configuration instructions include, but are not limited to, a band width part (BWP) handover instruction, control channel reconfiguration signaling, search space reconfiguration signaling, and control channel transmission configuration indication (TCI) indication signaling. According to relevant protocols, during beam recovery, the UE will directly and unconditionally execute the configuration instructions after receiving the configuration instructions through the control resources configured for the original beam link, while executing these configuration instructions may affect beam recovery (for example, may cause disorder in the beam recovery process, etc.), making beam recovery unable to be normally performed.

SUMMARY

Embodiments of the present disclosure provide a configuration signaling execution control method and apparatus, a device, a system and a storage medium, so that the issue that beam recovery may be affected due to the unconditional execution of configuration signaling when the configuration signaling is received in a beam recovery process.

A configuration signaling execution control method is provided in the embodiments of the present disclosure. The method includes the steps described below.

In a beam recovery process and in a case of receiving configuration signaling, an execution environment of the configuration signaling is decided.

An execution policy of the configuration signaling is determined according to a decision result.

A configuration signaling execution control apparatus is further provided in the embodiments of the present disclosure. The apparatus includes a detection module and a processing module.

The detection module is configured to: in a beam recovery process and in a case of receiving configuration signaling, decide an execution environment of the configuration signaling.

The processing module is configured to determine an execution policy of the configuration signaling according to a decision result of the detection module.

A user equipment is further provided in the embodiments of the present disclosure. The user equipment includes a processor, a memory and a communication bus.

The communication bus is configured to connect the processor and the memory.

The processor is configured to execute a computer program stored in the memory to implement the preceding configuration signaling execution control method.

A computer-readable storage medium is further provided in the embodiments of the present disclosure. The computer-readable storage medium stores one or more computer programs executable by one or more processors to implement the preceding configuration signaling execution control method.

A communication system is further provided in the embodiments of the present disclosure and includes a base station and a user equipment. The base station is configured to send configuration signaling to the user equipment.

The user equipment is configured to process the configuration signaling according to the preceding configuration signaling execution control method.

According to the configuration signaling execution control method and apparatus, the device, the system and the storage medium, in a beam recovery process performed by a user equipment with a base station and in a case where configuration signaling is received, the configuration signaling is not executed directly or unconditionally. The execution environment of the received configuration signaling is decided and the execution policy of the configuration signaling is determined according to a decision result. Therefore, in some implementation processes, the issue can be avoided as much as possible that the normally performing of beam recovery may be affected due to the unconditional and direct execution of the received configuration signaling in a beam recovery process.

DETAILED DESCRIPTION

Embodiments of the present disclosure are further described below in detail with reference to the drawings and implementations. It is to be understood that the embodiments described herein are merely intended to explain the present application and not to limit the present application.

Embodiment One

A configuration signaling execution control method is provided in this embodiment. According to the method, during beam recovery, an execution environment of received configuration signaling may be decided and an execution policy of the configuration signaling is determined according to a decision result, instead of directly and unconditionally executing the configuration signaling when the configuration signaling is received. Therefore, the control of the execution of the configuration signaling is more accurate and reasonable and the incorrect execution of the configuration signaling can be avoided as much as possible to thus avoid affecting the normally performing of beam recovery.

Figure 1:
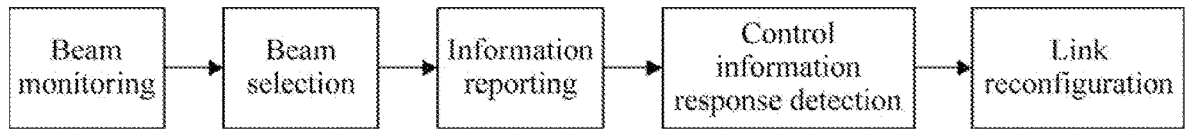
FIG. 1 is a schematic diagram of a beam recovery process according to embodiment one of the present application.

For ease of understanding, this embodiment is illustrated below by using an example of a beam recovery process. However, it is to be understood that the beam recovery process below is merely an example, and the configuration signaling execution control method provided by this embodiment is not limited to be applicable to the beam recovery process in the example described below. The beam recovery process in this example is shown in FIG. 1 and includes beam monitoring, beam selection, information reporting, control information response detection and link reconfiguration.

Beam monitoring: A beam failure can be monitored and decided in this process. This monitoring process may be, but is not limited to, that the beam failure is monitored and decided through a reference signal. The object to be monitored may be any reference signal (RS) including, for example, but not limited to, a channel state information reference signal (CSI-RS) or a synchronization signal (SS). In one example, the RS may be a quasi co-located RS of a control channel and indicated within a TCI.

Beam selection: A new beam is selected to be used for reestablishing a transmission link. After finding a beam failure, a user equipment may attempt to select a new beam that meets a condition from a configured reference signal set. For example, reference signal receiving power (RSRP) may be used as a basis for the beam selection.

Information reporting: Beam recovery related information such as user equipment indication information and beam indication information are reported. If a beam fails and a new beam may be selected, the user equipment may perform information reporting so that the base station acquires identifier (ID) information of the user equipment and information about the new beam.

Control information response detection: For example, downlink control signaling (DCI) is detected on a control channel. The user equipment may detect the DCI on a pre-configured new control channel for beam recovery to obtain a beam recovery response from the base station, and the control channel is sent by using a beam for reporting.

Link reconfiguration: The UE then receives control information on the new control channel for beam recovery on which the beam recovery response is detected, and the beam recovery is completed after signaling for reconfiguration control channel or reconfiguration control channel search space is received. Therefore, beam recovery may also be referred to as link reconfiguration. After issues occur in a previous original communication link, a temporary communication link is established based on the beam reported by the UE to obtain control information. Finally, reconfiguration is performed after some interactions are completed through the temporary communication link. A handover from the original communication link before beam recovery to the new communication link is performed.

In this embodiment, the relevant control resources corresponding to the original communication link before beam recovery may be referred to as a normal control resource set (Normal-CORESET). In the process of a beam handover, the relevant control resources corresponding to the temporary communication link established based on the beam reported by the UE are a beam failure recovery control resource set (BFR-CORESET). The relevant control resources corresponding to the new communication link finally established through the temporary link in the beam recovery may be referred to as a new normal control resource set.

In this embodiment, a control resource set (CORESET) is a resource area where a control channel is located, and the search space is control signaling detection space of the UE.

Figure 2:
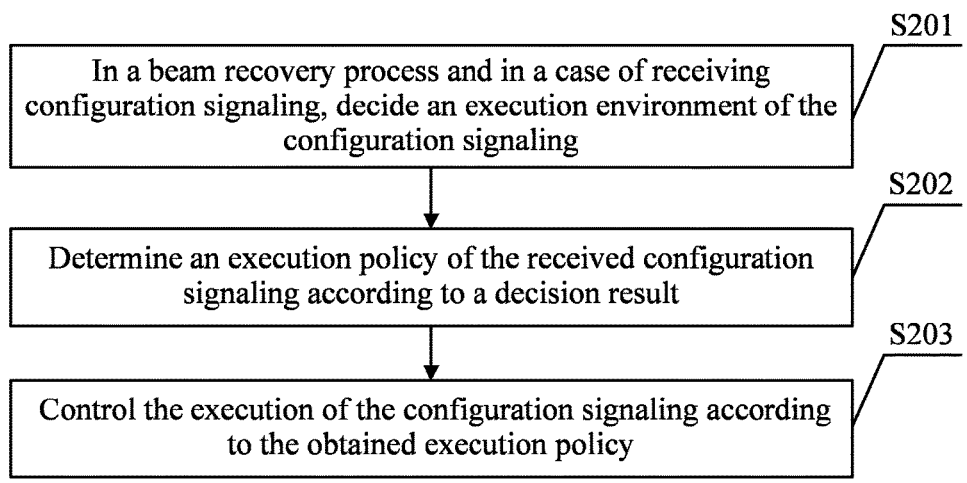
FIG. 2 is a flowchart of a configuration signaling execution control method according to embodiment one of the present application.

The configuration signaling execution control method provided in this embodiment is shown in FIG. 2 and includes the steps described below.

Step S201: In a beam recovery process and in a case of receiving configuration signaling, an execution environment of the configuration signaling is decided.

The configuration signaling in this embodiment includes, but is not limited to, physical layer configuration signaling and higher-layer configuration signaling. For example, the physical layer configuration signaling includes, but is not limited to, BWP handover signaling; the higher-layer configuration signaling includes, but is not limited to, at least one of control channel reconfiguration signaling, search space reconfiguration signaling or control channel TCI indication signaling.

Step S202: An execution policy of the received configuration signaling is determined according to an obtained decision result.

It is to be understood that the execution policy of the configuration signaling in this embodiment may be flexibly set according to specific application scenarios. For example, the execution policy may include at least two of executing the configuration signaling, refusing to execute the configuration signaling or conditionally (that is, in a case where a certain condition is satisfied) executing the configuration signaling.

Step S203: The execution of the configuration signaling is controlled according to the obtained execution policy.

For example, when the obtained execution policy is executing the configuration signaling, it is controlled that the configuration signaling is executed normally.

For example, when the obtained execution policy is refusing to execute the configuration signaling, it is controlled that the configuration signaling is not executed.

For example, when the obtained execution policy is conditionally executing the configuration signaling, it may be determined whether a corresponding condition is satisfied, and when it is determined that the corresponding condition is satisfied, it is controlled that the configuration signaling is executed normally; otherwise, it is controlled that the configuration signaling is refused to be executed or is processed in other manners.

For example, in an application scenario, beam recovery is generally used for communications in high-frequency bands, multiple BWPs are often configured in the high-frequency bands, and a BWP handover needs to be performed. In protocol 38.211, a BWP refers to a segment of contiguous cognitive resource blocks (CRBs) located in a component carrier (CC). When the UE has low traffic or no traffic, the UE may be handed over to a BWP with smaller bandwidth to reduce energy consumption. The introduction of the BWP can also improve the flexibility of the system. Each BWP may adopt a different configuration. An appropriate BWP is handed over to by the system according to traffic needs, improving the flexibility of the system. In relevant protocols, in a case where multiple BWPs exist in one CC, if one of the multiple BWPs is currently used for communications, a CORESET and a data channel physical downlink shared channel (PDSCH) may both be located in the one BWP, and the UE may not perform a detection on other BWPs in the CC. Therefore, in the beam recovery process, the UE not only may perform a detection on a beam failure recovery control resource set for receiving a beam recovery response but also needs to detect the originally configured normal control resource set (including, for example, but not limited to, the PDCCH) that is required to be detected and is not cut off. Therefore, the following situation may occur: "BWP handover signaling" may be detected in the original PDCCH. If such situation occurs, the beam recovery may be affected due to the user equipment performing a BWP handover in the beam recovery process, making the beam recovery unable to be performed normally, while subsequent communications may have major issues if no BWP handover is performed. Therefore, in one example, when the configuration signaling may include the BWP handover signaling and when the received configuration signaling is the BWP handover signaling, deciding the execution environment of the received configuration signaling may include, but is not limited to, at least one of the decisions described below.

Decision one: In a case where the BWP handover signaling is received through a normal control resource set, a receiving time point of the BWP handover signaling is decided.

In this embodiment, the receiving time point of the BWP handover signaling may be the time point when the BWP handover signaling is received.

Decision two: In a case where the BWP handover signaling is received during a beam recovery response detection period in the beam recovery process, it is decided whether the BWP handover signaling is received through a normal control resource set or a beam failure recovery control resource set.

Decision three: It is decided whether the BWP handover signaling includes target resource configuration information.

For example, in an application scenario, in a case where deciding the execution environment of the configuration signaling includes the decision one, the execution policy of the configuration signaling may be determined according to the decision result in a manner which may include, but is not limited to, any one of the manners described below.

Manner one: In a case where the decision result is that the receiving time point is before beam information reporting (the time point when beam information is reported may be the sending time (that is, reporting time) when the beam information is sent) in the beam recovery process, it is determined that the execution policy of the configuration signaling is executing the BWP handover signaling, or is executing the BWP handover signaling in a case where a first condition is satisfied.

Otherwise, it is determined that the execution policy of the configuration signaling is refusing to execute the BWP handover signaling, or is executing BWP handover signaling in a case where a second condition is satisfied.

For example, in one example, when the decision result is that the receiving time point is before the beam information reporting in the beam recovery process, it is determined that the execution policy of the configuration signaling is executing the BWP handover signaling; otherwise, it is determined that the execution policy of the configuration signaling is executing the BWP handover signaling when the second condition is satisfied. For example, in another example, when the decision result is that the receiving time point is before the beam information reporting in the beam recovery process, it is determined that the execution policy of the configuration signaling is executing the BWP handover signaling when the first condition is satisfied; otherwise, it is determined that the execution policy of the configuration signaling is refusing to execute the BWP handover signaling. For example, in one example, when the decision result is that the receiving time point is before the beam information reporting in the beam recovery process, it is determined that the execution policy of the configuration signaling is executing the BWP handover signaling; otherwise, it is determined that the execution policy of the configuration signaling is refusing to execute the BWP handover signaling. That is, the execution policies of the examples in this embodiment may be flexibly selected and combined according to specific application scenarios. In this embodiment, when the BWP handover signaling is received in the beam information reporting process, it may be determined, according to specific requirements, that the execution policy is executing the BWP handover signaling, executing the BWP handover signaling when the first condition or the second condition is satisfied, or refusing to execute the BWP handover signaling. It is to be understood that the first condition and the second condition in this embodiment may be set to be the same or different according to requirements, and the specific condition content may also be set according to specific application scenarios.

Manner two: In a case where the decision result is that the receiving time point is before beam selection in the beam recovery process is completed, it is determined that the execution policy of the configuration signaling is executing the BWP handover signaling, or is executing the BWP handover signaling in a case where a third condition is satisfied.

Otherwise, it is determined that the execution policy of the configuration signaling is refusing to execute the BWP handover signaling, or is executing the BWP handover signaling in a case where a fourth condition is satisfied.

For example, in one example, when the decision result is that the receiving time point is before the beam selection in the beam recovery process is completed, it is determined that the execution policy of the configuration signaling is executing the BWP handover signaling; otherwise, it is determined that the execution policy of the configuration signaling is refusing to execute the BWP handover signaling. For example, in another example, when the decision result is that the receiving time point is before the beam selection in the beam recovery process is completed, it is determined that the execution policy of the configuration signaling is executing the BWP handover signaling when the third condition is satisfied; otherwise, it is determined that the execution policy of the configuration signaling is refusing to execute the BWP handover signaling. For example, in one example, when the decision result is that the receiving time point is before the beam selection in the beam recovery process is completed, it is determined that the execution policy of the configuration signaling is executing the BWP handover signaling; otherwise, it is determined that the execution policy of the configuration signaling is executing the BWP handover signaling when the fourth condition is satisfied. That is, the execution policies of the examples in this embodiment may also be flexibly selected and combined according to specific application scenarios. It is to be understood that the third condition and the fourth condition in this embodiment may be also set to be the same or different according to requirements, and the specific condition content may also be set according to specific application scenarios.

In this embodiment, when a BWP handover is executed (the BWP handover may be executed according to the execution of the BWP handover signaling or the conditional execution of the BWP handover signaling) according to the determined execution policy, the method further includes, but is not limited to, any one of the steps described below (which steps are to be performed may be determined according to the specific time point when the BWP handover signaling is received).

After the BWP handover is executed, beam monitoring is re-performed, and it is determined whether beam selection is performed on a BWP after the handover according to a monitoring result. For example, this step may be executed in a case where the BWP handover signaling is received before beam monitoring is completed or beam selection is completed and the BWP handover is finally executed.

After the BWP handover is executed, it is determined whether beam selection is performed on a BWP after the handover according to a beam monitoring result obtained before the BWP handover. For example, this step may be executed in a case where the BWP handover signaling is received after beam monitoring is completed and before beam selection is completed and the BWP handover is finally executed.

After the BWP handover is executed, beam information reporting is performed according to a beam selection result obtained before the BWP handover. For example, this step may be executed in a case where the BWP handover signaling is received after beam monitoring is completed, after beam selection is completed and before beam information reporting and the BWP handover is finally executed.

For example, in an application scenario, in a case where deciding the execution environment of the configuration signaling includes the decision two, determining the execution policy of the configuration signaling according to the decision result may include, but is not limited to the following: in a case where the decision result is that reception is performed through the normal control resource set, it is determined that the execution policy of the configuration signaling is refusing to execute the BWP handover signaling, or is executing the BWP handover signaling in a case where a fifth condition is satisfied; or in a case where the decision result is that reception is performed through the beam failure recovery control resource set, it is determined that the execution policy of the configuration signaling is executing the BWP handover signaling, or is executing the BWP handover signaling in a case where a sixth condition is satisfied.

For example, in one example, when the decision result is that reception is performed through the normal control resource set, it is determined that the execution policy of the configuration signaling is refusing to execute the BWP handover signaling; when the decision result is that reception is performed through the beam failure recovery control resource set, it is determined that the execution policy of the configuration signaling is executing the BWP handover signaling. For example, in another example, when the decision result is that reception is performed through the normal control resource set, it is determined that the execution policy of the configuration signaling is executing the BWP handover signaling when the fifth condition is satisfied; when the decision result is that reception is performed through the beam failure recovery control resource set, it is determined that the execution policy of the configuration signaling is executing the BWP handover signaling. For example, in one example, when the decision result is that reception is performed through the normal control resource set, it is determined that the execution policy of the configuration signaling is refusing to execute the BWP handover signaling; when the decision result is that reception is performed through the beam failure recovery control resource set, it is determined that the execution policy of the configuration signaling is executing the BWP handover signaling when the sixth condition is satisfied. That is, the execution policies of the examples in this embodiment may also be flexibly selected and combined according to specific application scenarios. It is to be understood that the fifth condition and the sixth condition in this embodiment may be also set to be the same or different according to requirements, and the specific condition content may also be set according to specific application scenarios.

It is to be understood that the first condition, the second condition, the third condition, the fourth condition, the fifth condition and the sixth condition may be set to be the same, may be set to be different, may be partially set to be the same, or may be partially set to be different or the like. For example, in one example, at least one of the first condition, the second condition, the third condition, the fourth condition, the fifth condition or the sixth condition may include the following: the BWP handover signaling includes the target resource configuration information, and the target resource configuration information may include, but is not limited to, at least one of: reference signal resource configuration information of a target BWP, physical random access channel (PRACH) resource configuration information of a target BWP or control channel configuration information of a target BWP.

For example, in an application scenario, in a case where deciding the execution environment of the configuration signaling includes the decision three, determining the execution policy of the configuration signaling according to the decision result may include the following: in a case where the decision result is that the target resource configuration information is included, the BWP handover signaling is executed; otherwise, the BWP handover signaling may be refused to be executed or may be processed in other manners. The target resource configuration information in this embodiment may also include, but is not limited to, at least one of: reference signal resource configuration information of a target BWP, PRACH resource configuration information of a target BWP or control channel configuration information of a target BWP.

It is to be understood that in this embodiment, any one of the decision manners of the decision one, the decision two and the decision three described above may be adopted, or a combination of at least two of the three decision manners may be adopted, for example, a combination of the decision one and the decision two may be adopted.

In some application scenarios, in addition to physical layer BWP handover signaling, the UE may also receive higher-layer configuration signaling during beam recovery. For example, the higher-layer configuration signaling includes, but is not limited to, at least one of control channel CORESET reconfiguration signaling, search space reconfiguration signaling or control channel TCI indication signaling. These higher-layer configuration signaling may cause disorder in a beam recovery process like BWP handover signaling. Therefore, in one example, in a case where the configuration signaling may include higher-layer configuration signaling and the received configuration signaling is the higher-layer configuration signaling, deciding the execution environment of the received configuration signaling may include, but is not limited to at least one of decision four or decision five. Decision four: In a case where the higher-layer configuration signaling is received through a normal control resource set, a receiving time point of the higher-layer configuration signaling is decided. Decision five: In a case where the higher-layer configuration signaling is received during a beam recovery response detection period in the beam recovery process, it is decided whether the higher-layer configuration signaling is received through the normal control resource set or a beam failure recovery control resource set.

For example, in one example, in a case where deciding the execution environment of the configuration signaling includes the decision four, the execution policy of the configuration signaling may be determined according to the decision result in a manner which may include, but is not limited to, any one of the decision manners described below.

Manner one: In a case where the decision result is that the receiving time point is before beam information reporting in the beam recovery process, it is determined that the execution policy of the configuration signaling is executing the higher-layer configuration signaling, or is executing the higher-layer configuration signaling in a case where a seventh condition is satisfied; otherwise, it is determined that the execution policy of the configuration signaling is refusing to execute the higher-layer configuration signaling, or is executing the higher-layer configuration signaling in a case where an eighth condition is satisfied.

For example, in one example, when the decision result is that the receiving time point is before the beam information reporting in the beam recovery process, it is determined that the execution policy of the configuration signaling is executing the higher-layer configuration signaling; otherwise, it is determined that the execution policy of the configuration signaling is executing the higher-layer configuration signaling when the eighth condition is satisfied. For example, in another example, when the decision result is that the receiving time point is before the beam information reporting in the beam recovery process, it is determined that the execution policy of the configuration signaling is executing the higher-layer configuration signaling when the seventh condition is satisfied; otherwise, it is determined that the execution policy of the configuration signaling is refusing to execute the higher-layer configuration signaling. For example, in one example, when the decision result is that the receiving time point is before the beam information reporting in the beam recovery process, it is determined that the execution policy of the configuration signaling is executing the higher-layer configuration signaling; otherwise, it is determined that the execution policy of the configuration signaling is refusing to execute the higher-layer configuration signaling. That is, the execution policies of the examples in this embodiment may be flexibly selected and combined according to specific application scenarios. In this embodiment, when the higher-layer configuration signaling is received in the beam information reporting process, it may be determined, according to specific requirements, that the execution policy is executing the higher-layer configuration signaling, executing the higher-layer configuration signaling when the seventh condition or the eighth condition is satisfied, or refusing to execute the higher-layer configuration signaling. It is to be understood that the seventh condition and the eighth condition in this embodiment may be set to be the same or different according to requirements, and the specific condition content may also be set according to specific application scenarios.

Manner two: In a case where the decision result is that the receiving time point is before beam selection in the beam recovery process is completed, it is determined that the execution policy of the configuration signaling is executing the higher-layer configuration signaling, or is executing the higher-layer configuration signaling in a case where a ninth condition is satisfied; otherwise, it is determined that the execution policy of the configuration signaling is refusing to execute the higher-layer configuration signaling, or is executing the higher-layer configuration signaling in a case where a tenth condition is satisfied.

For example, in one example, when the decision result is that the receiving time point is before the beam selection in the beam recovery process is completed, it is determined that the execution policy of the configuration signaling is executing the higher-layer configuration signaling; otherwise, it is determined that the execution policy of the configuration signaling is executing the higher-layer configuration signaling when the tenth condition is satisfied. For example, in another example, when the decision result is that the receiving time point is before the beam selection in the beam recovery process is completed, it is determined that the execution policy of the configuration signaling is executing the higher-layer configuration signaling when the ninth condition is satisfied; otherwise, it is determined that the execution policy of the configuration signaling is refusing to execute the higher-layer configuration signaling. For example, in one example, when the decision result is that the receiving time point is before the beam selection in the beam recovery process is completed, it is determined that the execution policy of the configuration signaling is executing the higher-layer configuration signaling; otherwise, it is determined that the execution policy of the configuration signaling is refusing to execute the higher-layer configuration signaling. That is, the execution policies of the examples in this embodiment may be flexibly selected and combined according to specific application scenarios. It is to be understood that the ninth condition and the tenth condition in this embodiment may be set to be the same or different according to requirements, and the specific condition content may also be set according to specific application scenarios.

For example, in one example, in a case where deciding the execution environment of the configuration signaling includes the decision five, determining the execution policy of the configuration signaling according to the decision result may include, but is not limited to the following: in a case where the decision result is that reception is performed through the normal control resource set, it is determined that the execution policy of the configuration signaling is refusing to execute the higher-layer configuration signaling, or is executing the BWP handover signaling in a case where an eleventh condition is satisfied; or in a case where the decision result is that reception is performed through the beam failure recovery control resource set, it is determined that the execution policy of the configuration signaling is executing the higher-layer configuration signaling, or is executing the BWP handover signaling in a case where a twelfth condition is satisfied.

For example, in one example, when the decision result is that reception is performed through the normal control resource set, it is determined that the execution policy of the configuration signaling is refusing to execute the higher-layer configuration signaling; when the decision result is that reception is performed through the beam failure recovery control resource set, it is determined that the execution policy of the configuration signaling is executing the higher-layer configuration signaling. For example, in another example, when the decision result is that reception is performed through the normal control resource set, it is determined that the execution policy of the configuration signaling is executing the higher-layer configuration signaling when the eleventh condition is satisfied; when the decision result is that reception is performed through the beam failure recovery control resource set, it is determined that the execution policy of the configuration signaling is executing the higher-layer configuration signaling. For example, in one example, when the decision result is that reception is performed through the normal control resource set, it is determined that the execution policy of the configuration signaling is refusing to execute the higher-layer configuration signaling; when the decision result is that reception is performed through the beam failure recovery control resource set, it is determined that the execution policy of the configuration signaling is executing the higher-layer configuration signaling when the twelfth condition is satisfied. That is, the execution policies of the examples in this embodiment may also be flexibly selected and combined according to specific application scenarios. It is to be understood that the eleventh condition and the twelfth condition in this embodiment may also be set to be the same or different according to requirements, and the specific condition content may also be set according to specific application scenarios.

It is to be understood that the seventh condition, the eighth condition, the ninth condition, the tenth condition, the eleventh condition and the twelfth condition may be set to be the same, may be set to be different, may be partially set to be the same, may be partially set to be different or the like.

According to the configuration signaling execution control method provided in this embodiment, in a beam recovery process performed by a user equipment with a base station and in a case where configuration signaling is received, the configuration signaling is not executed directly or unconditionally. The execution environment of the received configuration signaling is decided. For example, such decision may include, but is not limited to, deciding at least one aspect of a receiving time point of the configuration signaling, a type of a control resource set for transmitting the configuration signaling or configuration information in the configuration signaling. The execution policy of the configuration signaling is thus determined according to a decision result, for example, the execution policy is executing the configuration signaling, refusing the configuration signaling, conditionally executing the configuration signaling or the like. Therefore, the issue can be avoided as much as possible that the normally performing of beam recovery may be affected due to the received configuration signaling being unconditionally and directly executed in a beam recovery process. It can not only be ensured that the configuration signaling can be reasonably executed during beam recovery but also be ensured as much as possible that the execution of the configuration signaling will not affect the normally performing of beam recovery.

Embodiment Two

To facilitate understanding, this embodiment is illustrated by using an example in which a user equipment receives BWP handover signaling during beam recovery with a base station and an example in which a user equipment receives high-layer configuration signaling during beam recovery with a base station, respectively.

Example One

Figure 3:
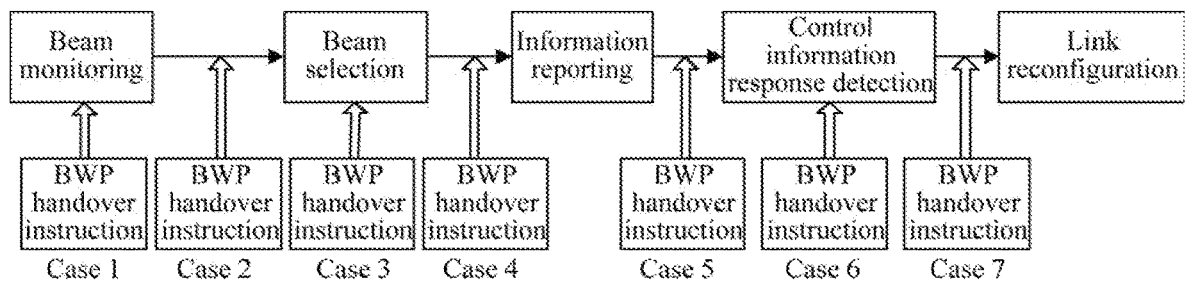
FIG. 3 is a schematic diagram of BWP handover instruction reception in a beam recovery process according to embodiment two of the present application.

This example is illustrated by using application scenarios in which the user equipment may receive BWP handover signaling in various cases shown in FIG. 3. Based on the cases shown in FIG. 3, the situations of receiving BWP handover signaling in the various cases are summarized in Table 1 below.

TABLE 1

|  | Time when BWP handover signaling is received | Control area where a BWP handover is detected | Normal-CORESET/BFR-CORESET enable state |
| --- | --- | --- | --- |
| Case 1 | During a beam monitoring process | Normal-CORESET | Normal-CORESET normally operating BFR-CORESET being not enabled |
| Case 2 | Time after completion of beam monitoring and decision as a beam failure and before beam selection | Normal-CORESET | Normal-CORESET normally operating BFR-CORESET being not enabled |
| Case 3 | Time when the beam selection is started but no beam satisfying a condition has been selected | Normal-CORESET | Normal-CORESET normally operating BFR-CORESET being not enabled |
| Case 4 | Time when the beam | Normal-CORESET | Normal-CORESET |

TABLE 1-continued

| | | Time when BWP handover signaling is received | Control area where a BWP handover is detected | Normal-CORESET/BFR-CORESET enable state |
|---|---|---|---|---|
| | | selection is completed and beam recovery information has not been reported | | normally operating BFR-CORESET being not enabled |
| Case 5 | | Time after the beam recovery information has been reported for a period of time and when the detection of BFR-CORESET is not started | Normal-CORESET | Normal-CORESET normally operating BFR-CORESET being not enabled |
| Case 6 | 6-1 | During a beam recovery response detection period | Normal-CORESET | Normal-CORESET normally operating BFR-CORESET being enabled |
| | 6-2 | | BFR-CORESE | |
| Case 7 | | Time after a beam recovery response is detected | BFR-CORESET | Normal-CORESET being disabled BFR-CORESET being enabled |

In Table 1, the Normal-CORESET is a normal control resource set, and the BFR-CORESET is a beam failure recovery control resource set.

As described in the preceding embodiment, in this embodiment, when the physical layer BWP handover signaling is received, the execution strategy may be determined according to the receiving time point of receiving the BWP handover signaling.

In cases 1 to 6 in Table 1, the UE all needs to detect a Normal-CORESET, and it is possible to receive a BWP handover instruction in the Normal-CORESET during this period. In the early stage of beam recovery, measurement work is mainly involved. A BWP handover may cause some measurements which have not completed to stop halfway, and measurements can only be restarted on a new BWP. Although this manner will make it impossible to obtain accurate measurement results during a certain period of time and the real-time performance of measurements may be affected, no serious disorder will be caused in the beam recovery process if the measurement of a reference signal can still be performed after the handover to the new BWP. In the later stage of beam recovery, if processes such as a control signaling detection are involved, the user equipment will not be able to understand these processes consistently after the BWP handover. Therefore, in this example, the UE may detect the Normal-CORESET during beam recovery. If the physical layer BWP handover signaling is detected in the Normal-CORESET, it indicates that the BWP handover signaling is received in any one of the preceding cases 1 to 6. At this time, the execution of the BWP handover signaling may be controlled in the processing manner described below.

The specific receiving time point when the BWP handover signaling is received is decided, and the execution policy of the BWP handover is determined according to the decision result.

For example, the execution policy in this embodiment includes, but is not limited to, at least two of the following policies: executing the BWP handover signaling, refusing to execute the BWP handover signaling or conditionally executing the BWP handover signaling. The condition here may be any one or more of the first condition, the second condition, the third condition or the fourth condition in embodiment one.

For example, one determination manner may be as follows: in a case where the decision result is that the receiving time point is before beam information reporting (the time point when beam information is reported may be the sending time (that is, reporting time) when the beam information is sent) in the beam recovery process, it is determined that the execution policy of the configuration signaling is executing the BWP handover signaling; in a case where the decision result is that the receiving time point is after the beam information reporting in the beam recovery process, it is determined that the execution policy of the configuration signaling is refusing to execute the BWP handover signaling or is executing BWP handover signaling in a case where the second condition is satisfied.

For example, one determination manner may be as follows: in a case where the decision result is that the receiving time point is before beam selection in the beam recovery process is completed, it is determined that the execution policy of the configuration signaling is executing the BWP handover signaling; in a case where the decision result is that the receiving time point is after the beam selection in the beam recovery process is completed, it is determined that the execution policy of the configuration signaling is refusing to execute the BWP handover signaling or is executing the BWP handover signaling in a case where the fourth condition is satisfied.

The second condition and the fourth condition in this example may be as follows: the BWP handover signaling includes target resource configuration information, and the target resource configuration information includes at least one of: reference signal resource configuration information of a target BWP, PRACH resource configuration information of a target BWP or control channel configuration information of a target BWP.

In this embodiment, when a BWP handover is performed (the BWP handover may be executed according to the execution of the BWP handover signaling or the conditional execution of the BWP handover signaling) according to the determined execution policy, the method further includes, but is not limited to, any one of the steps described below.

After the BWP handover is executed, beam monitoring is re-performed, and it is determined whether beam selection is performed on a BWP after the handover according to a monitoring result. For example, this step may be executed in a case where the BWP handover signaling is received before beam monitoring is completed or beam selection is completed and the BWP handover is finally executed.

After the BWP handover is executed, it is determined whether beam selection is performed on a BWP after the handover according to a beam monitoring result obtained before the BWP handover. For example, this step may be executed in a case where the BWP handover signaling is received after beam monitoring is completed and before beam selection is completed and the BWP handover is finally executed.

After the BWP handover is executed, beam information reporting is performed according to a beam selection result obtained before the BWP handover. For example, this step may be executed in a case where the BWP handover signaling is received after beam monitoring is completed, after beam selection is completed and before beam information reporting and the BWP handover is finally executed.

The BWP handover signaling control method provided in this example can avoid complicated standardization work. Refusing to execute the BWP handover signaling or not executing the BWP handover signaling if the target BWP indicated by the BWP handover signaling does not satisfy some conditions can reduce the complexity of the standardization and the complexity of the user equipment.

As described in the preceding embodiment, in this embodiment, when the physical layer BWP handover signaling is received, the execution strategy may also be determined according to the type of the control resource for receiving the BWP handover signaling. In addition, in this embodiment, this manner may be adopted during the beam recovery response detection period in the beam recovery process, that is, different decision rules in embodiment one may be adopted at different stages of beam recovery in this embodiment. In this example, the execution of the BWP handover signaling may be controlled in the processing manner described below.

The UE performs a detection on the Normal-CORESET and the BFR-CORESET, decides the CORESET where the physical layer BWP handover signaling is received, determines whether the physical layer BWP handover signaling is detected in the Normal-CORESET or the BFR-CORESET, and determines the execution policy of the BWP handover signaling according to the decision result.

For example, when the decision result is that reception is performed through the Normal-CORESET, it is determined that the execution policy of the configuration signaling is refusing to execute the BWP handover signaling or is executing the BWP handover signaling when a fifth condition is satisfied.

For example, when the decision result is that reception is performed through the BFR-CORESET, it is determined that the execution policy of the configuration signaling is executing the BWP handover signaling or is executing the BWP handover signaling when a sixth condition is satisfied.

The fifth condition and the sixth condition in this example may also be as follows: the BWP handover signaling includes target resource configuration information, and the target resource configuration information includes at least one of: reference signal resource configuration information of a target BWP, PRACH resource configuration information of a target BWP or control channel configuration information of a target BWP.

As described in the preceding embodiment, in this embodiment, when the physical layer BWP handover signaling is received, the execution strategy may be determined according to the target resource configuration information included in the BWP handover signaling. At this time, the execution of the BWP handover signaling may be controlled in the processing manner described below.

The target BWP resource configuration information in the BWP handover signaling is decided, and the execution policy of the BWP handover signaling is determined according to the target BWP resource configuration information.

For example, when the decision result is that the target resource configuration information is included, the BWP handover signaling is executed; otherwise, the BWP handover signaling may be refused to be executed or may be processed in other manners. The target resource configuration information in this embodiment may also include, but is not limited to, at least one of: reference signal resource configuration information of a target BWP, PRACH resource configuration information of a target BWP or control channel configuration information of a target BWP.

Example Two

This example is illustrated by using an application scenario in which a user equipment may receive higher-layer configuration signaling in a beam recovery process. When the higher-layer configuration signaling is received in the beam recovery process, the processing process may be similar to the preceding processing process of the higher-layer configuration signaling.

For example, in this example, the UE may perform a detection on a Normal-CORESET during beam recovery. If the higher-layer configuration signaling (including, but not limited to at least one of control channel reconfiguration signaling, search space reconfiguration signaling or control channel TCI indication signaling) is detected in the Normal-CORESET, the execution of the higher-layer configuration signaling may be controlled in the processing manner described below.

The specific receiving time point when the higher-layer configuration signaling is received is decided, and an execution policy of the higher-layer configuration signaling is determined according to a decision result.

For example, the execution policy in this embodiment includes, but is not limited to, at least two of the following policies: executing the higher-layer configuration signaling, refusing to execute the higher-layer configuration signaling or conditionally executing the higher-layer configuration signaling. The condition here may be any one or more of the conditions illustrated in embodiment one.

For example, one determination manner may be as follows: in a case where the decision result is that the receiving time point is before beam information reporting in the beam recovery process, it is determined that the execution policy of the configuration signaling is executing the higher-layer configuration signaling; in a case where the decision result is that the receiving time point is after the beam information reporting in the beam recovery process, it is determined that the execution policy of the configuration signaling is refusing to execute the higher-layer configuration signaling.

For example, one determination manner may be as follows: in a case where the decision result is that the receiving time point is before beam selection in the beam recovery process is completed, it is determined that the execution policy of the configuration signaling is executing the higher-layer configuration signaling; in a case where the decision result is that the receiving time point is after the beam selection in the beam recovery process is completed, it is determined that the execution policy of the configuration signaling is refusing to execute the higher-layer configuration signaling.

As described in the preceding embodiment, in this embodiment, when the higher-layer configuration signaling is received, the execution strategy may also be determined according to the type of the control resource for receiving the higher-layer configuration signaling. In addition, in this embodiment, this manner may be adopted during a beam recovery response detection period in the beam recovery process, that is, different decision rules illustrated in embodiment one may be adopted at different stages of beam recovery in this embodiment. In this example, the execution of the higher-layer configuration signaling may be controlled in the processing manner described below.

The UE performs a detection on the Normal-CORESET and the BFR-CORESET, decides the CORESET where the higher-layer configuration signaling is received, determines whether the higher-layer configuration signaling is detected in the Normal-CORESET or the BFR-CORESET, and determines the execution policy of the higher-layer configuration signaling according to a decision result.

For example, when the decision result is that reception is performed through the Normal-CORESET, it is determined that the execution policy of the configuration signaling is refusing to execute the higher-layer configuration signaling.

For example, when the decision result is that reception is performed through the BFR-CORESET, it is determined that the execution policy of the configuration signaling is executing the higher-layer configuration signaling.

The configuration signaling execution control manners in example one and example two provided in this embodiment are merely examples of the control for facilitating understanding. It is to be understood that specific control policies can be flexibly adjusted according to specific application scenarios.

Embodiment Three

Figure 4:
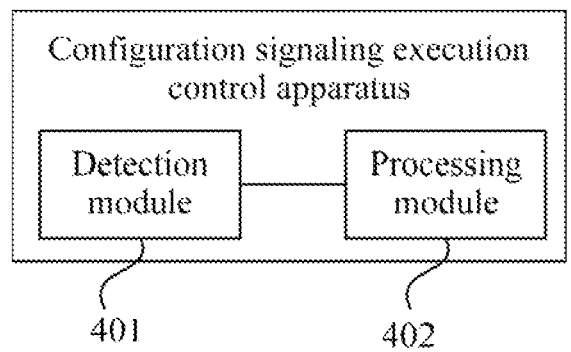
FIG. 4 is a structure diagram of a configuration signaling execution control apparatus according to embodiment three of the present application.

This embodiment provides a configuration signaling execution control apparatus which may be applied to various user equipments. Referring to FIG. 4, the apparatus includes a detection module 401 and a processing module 402.

The detection module 401 is configured to: in a beam recovery process and in a case of receiving configuration signaling, decide an execution environment of the configuration signaling.

The configuration signaling in this embodiment includes, but is not limited to, physical layer configuration signaling and higher-layer configuration signaling. For example, the physical layer configuration signaling includes, but is not limited to, BWP handover signaling; the higher-layer configuration signaling includes, but is not limited to, at least one of control channel reconfiguration signaling, search space reconfiguration signaling or control channel TCI indication signaling.

In this embodiment, the decision of the execution environment of the configuration signaling includes, but is not limited to, deciding at least one aspect of a receiving time point of the configuration signaling, a type of a control resource set for transmitting the configuration signaling or configuration information in the configuration signaling.

The processing module 402 is configured to determine an execution policy of the configuration signaling according to a decision result of the detection module. It is to be understood that the execution policy of the configuration signaling in this embodiment may be flexibly set according to specific application scenarios. For example, the execution policy may include at least two of executing the configuration signaling, refusing to execute the configuration signaling or conditionally (that is, in a case where a certain condition is satisfied) executing the configuration signaling.

In one example, when the configuration signaling may include BWP handover signaling and when the configuration signaling received by the detection module 401 is the BWP handover signaling, deciding the execution environment of the received configuration signaling may include, but is not limited to, at least one of the decisions described below.

Decision one: In a case where the BWP handover signaling is received through a normal control resource set, a receiving time point of the BWP handover signaling is decided.

Decision two: In a case where the BWP handover signaling is received during a beam recovery response detection period in the beam recovery process, it is decided whether the BWP handover signaling is received through a normal control resource set or a beam failure recovery control resource set.

Decision three: It is decided whether the BWP handover signaling includes target resource configuration information.

The processing module 402 may be configured to: in a case where deciding the execution environment of the configuration signaling includes the decision one and the decision result is that the receiving time point is before beam information reporting in the beam recovery process, determine that the execution policy of the configuration signaling is executing the BWP handover signaling, or is executing the BWP handover signaling in a case where a first condition is satisfied; otherwise, determine that the execution policy of the configuration signaling is refusing to execute the BWP handover signaling, or is executing the BWP handover signaling in a case where a second condition is satisfied.

Alternatively, the processing module 402 may be configured to: in a case where the decision result is that the receiving time point is before beam selection in the beam recovery process is completed, determine that the execution policy of the configuration signaling is executing the BWP handover signaling, or is executing the BWP handover signaling in a case where a third condition is satisfied; otherwise, determine that the execution policy of the configuration signaling is refusing to execute the BWP handover signaling, or is executing the BWP handover signaling in a case where a fourth condition is satisfied.

In this embodiment, when the processing module 402 performs a BWP handover (a BWP is executed according to the execution of the BWP handover signaling or the conditional execution of the BWP handover signaling) according to the determined execution policy, the flow further includes, but is not limited to, any one of the steps described below (which steps are to be performed may be determined according to the specific time point when the BWP handover signaling is received).

After the BWP handover is executed, beam monitoring is re-performed, and it is determined whether beam selection is performed on a BWP after the handover according to a monitoring result. For example, this step may be executed in a case where the BWP handover signaling is received before beam monitoring is completed or beam selection is completed and the BWP handover is finally executed.

After the BWP handover is executed, it is determined whether beam selection is performed on a BWP after the handover according to a beam monitoring result obtained before the BWP handover. For example, this step may be executed in a case where the BWP handover signaling is received after beam monitoring is completed and before beam selection is completed and the BWP handover is finally executed.

After the BWP handover is executed, beam information reporting is performed according to a beam selection result obtained before the BWP handover. For example, this step may be executed in a case where the BWP handover signaling is received after beam monitoring is completed, after beam selection is completed and before beam information reporting and the BWP handover is finally executed.

It is to be understood that the first condition, the second condition, the third condition, the fourth condition, the fifth condition and the sixth condition may be set to be the same, may be set to be different, may be partially set to be the same, or may be partially set to be different or the like. For example, in one example, at least one of the first condition, the second condition, the third condition, the fourth condition, the fifth condition or the sixth condition may include the following: the BWP handover signaling includes target resource configuration information, and the target resource configuration information may include, but is not limited to, at least one of: reference signal resource configuration information of a target BWP, PRACH resource configuration information of a target BWP or control channel configuration information of a target BWP.

For example, in an application scenario, in a case where deciding the execution environment of the configuration signaling by the processing module 402 includes the decision two, the execution policy of the configuration signaling may be determined according to the decision result in a manner which may include, but is not limited to, the manner described below.

When the decision result is that reception is performed through the normal control resource set, it is determined that the execution policy of the configuration signaling is refusing to execute the BWP handover signaling or is executing the BWP handover signaling when a fifth condition is satisfied.

When the decision result is that reception is performed through the beam failure recovery control resource set, it is determined that the execution policy of the configuration signaling is executing the BWP handover signaling or is executing the BWP handover signaling when a sixth condition is satisfied.

For example, in an application scenario, in a case where deciding the execution environment of the configuration signaling includes the decision three, the execution policy of the configuration signaling may be determined according to the decision result in a manner which may include the manner described below.

When the decision result is that the target resource configuration information is included, the BWP handover signaling is executed; otherwise, the BWP handover signaling may be refused to be executed or may be processed in other manners. The target resource configuration information in this embodiment may also include, but is not limited to, at least one of: reference signal resource configuration information of a target BWP, PRACH resource configuration information of a target BWP or control channel configuration information of a target BWP.

It is to be understood that in this embodiment, any one of the decision manners of the decision one, the decision two and the decision three described above may be adopted, or a combination of at least two of the three decision manners may be adopted, for example, a combination of the decision one and the decision two may be adopted.

In some application scenarios, in addition to physical layer BWP handover signaling, the UE may also receive higher-layer configuration signaling during beam recovery. For example, the higher-layer configuration signaling includes, but is not limited to, at least one of control channel CORESET reconfiguration signaling, search space reconfiguration signaling or control channel TCI indication signaling. These higher-layer configuration signaling may cause disorder in the beam recovery process like BWP handover signaling. Therefore, in one example, in a case where the configuration signaling may include higher-layer configuration signaling and the configuration signaling received by the detection module 401 is the higher-layer configuration signaling, deciding the execution environment of the received configuration signaling may include, but is not limited to, at least one of the decisions described below.

Decision four: In a case where the higher-layer configuration signaling is received through a normal control resource set, a receiving time point of the higher-layer configuration signaling is decided.

Decision five: In a case where the higher-layer configuration signaling is received during a beam recovery response detection period in the beam recovery process, it is decided whether the higher-layer configuration signaling is received through the normal control resource set or a beam failure recovery control resource set.

For example, in one example, the processing module 402 may be configured to: in a case where deciding the execution environment of the configuration signaling includes the decision four, determine the execution policy of the configuration signaling according to the decision result in a manner which may include, but is not limited to, any one of the decision manners described below.

Manner one: In a case where the decision result is that the receiving time point is before beam information reporting in the beam recovery process, it is determined that the execution policy of the configuration signaling is executing the higher-layer configuration signaling, or is executing the higher-layer configuration signaling in a case where a seventh condition is satisfied; otherwise, it is determined that the execution policy of the configuration signaling is refusing to execute the higher-layer configuration signaling, or is executing the higher-layer configuration signaling in a case where an eighth condition is satisfied.

Manner two: In a case where the decision result is that the receiving time point is before beam selection in the beam recovery process is completed, it is determined that the execution policy of the configuration signaling is executing the higher-layer configuration signaling, or is executing the higher-layer configuration signaling in a case where a ninth condition is satisfied; otherwise, it is determined that the execution policy of the configuration signaling is refusing to execute the higher-layer configuration signaling, or is executing the higher-layer configuration signaling in a case where a tenth condition is satisfied.

For example, in one example, the processing module 402 may be configured to: in a case where deciding the execution environment of the configuration signaling by the processing module 402 includes the decision five, determine the execution policy of the configuration signaling according to the decision result in a manner which may include, but is not limited to, the manner described below.

When the decision result is that reception is performed through the normal control resource set, it is determined that the execution policy of the configuration signaling is refusing to execute the higher-layer configuration signaling or is executing BWP handover signaling when an eleventh condition is satisfied.

When the decision result is that reception is performed through the beam failure recovery control resource set, it is determined that the execution policy of the configuration signaling is refusing to execute the higher-layer configuration signaling or is executing the BWP handover signaling when a twelfth condition is satisfied.

It is to be understood that the seventh condition, the eighth condition, the ninth condition, the tenth condition, the eleventh condition and the twelfth condition may be set to be the same, may be set to be different, may be partially set to be the same, may be partially set to be different or the like.

It is to be understood that the functions of the detection module 401 and the processing module 402 in this embodiment can be implemented by a processor or controller in the user equipment.

Embodiment Four

This embodiment further provides a user equipment. The user equipment includes, but is not limited to, mobile user equipment such as a smart phone, a notebook computer, a digital broadcast receiver, a personal digital assistant (PDA), a PAD, a portable multimedia player (PMP) and a navigation apparatus and fixed user equipment such as a digital TV and a desktop computer.

Figure 5:
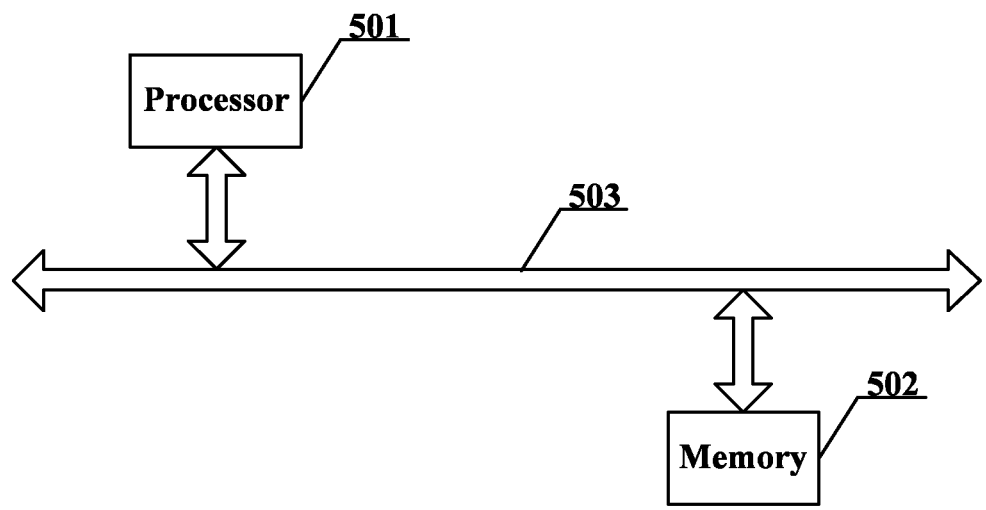
FIG. 5 is a structure diagram of a user equipment according to embodiment four of the present application.

Referring to FIG. 5, the user equipment includes a processor 501, a memory 502 and a communication bus 503. The communication bus 503 is configured to implement a communication and connection between the processor 501 and the memory 502. In one example, the processor 501 may be configured to execute one or more computer programs stored in the memory 502 to implement the configuration signaling execution control method as described in each of the preceding embodiments.

This embodiment further provides a communication system including a base station and a user equipment. The base station is configured to send configuration signaling to the user equipment. The user equipment is configured to process the received configuration signaling according to the configuration signaling execution control method as described in each of the preceding embodiments.

This embodiment further provides a computer-readable storage medium. The computer-readable storage medium includes volatile or nonvolatile, removable or non-removable media implemented in any method or technology for storage of information (such as computer-readable instructions, data structures, computer program modules or other data). The computer-readable storage medium includes, but is not limited to, a random access memory (RAM), a read-only memory (ROM), an electrically erasable programmable read only memory (EEPROM), a flash memory, or another memory technology, a compact disc read-only memory (CD-ROM), a digital versatile disc (DVD) or another optical disc storage, a magnetic cassette, a magnetic tape, magnetic disk storage or another magnetic storage apparatus, or any other medium used for storing desired information and accessible by a computer.

In one example, the computer-readable storage medium in this embodiment may be configured to store one or more computer programs, where the one or more computer programs are executable by one or more processors to implement the configuration signaling execution control method as described in each of the preceding embodiments.

This embodiment further provides a computer program (or computer software) which may be distributed on a computer-readable medium and executed by a computing apparatus to implement the configuration signaling execution control method as described in each of the preceding embodiments. In some circumstances, at least one step illustrated or described may be executed in sequences different from those described in the preceding embodiments.

This embodiment further provides a computer program product. The computer program product includes a computer-readable apparatus on which the preceding computer program is stored. The computer-readable apparatus in this embodiment may include the computer-readable storage medium illustrated above.

It can be seen that those having ordinary skill in the art should understand that all or part of the steps of the method, and functional modules/units in the system and the apparatus disclosed above may be implemented as software (which may be implemented by computer program codes executable by a computing apparatus), firmware, hardware and appropriate combinations thereof. In the hardware implementation, the division of the preceding functional modules/units may not correspond to the division of physical components. For example, one physical component may have multiple functions, or one function or step may be performed jointly by several physical components. Some or all physical components may be implemented as software executed by a processor such as a central processing unit, a digital signal processor or a microprocessor, may be implemented as hardware, or may be implemented as integrated circuits such as application-specific integrated circuits.

Additionally, as is known to those having ordinary skill in the art, communication media generally include computer-readable instructions, data structures, computer program modules, or other data in carriers or in modulated data signals transported in other transport mechanisms and may include any information delivery medium. Therefore, the present application is not limited to any particular combination of hardware and software.

The above is a more detailed description of embodiments of the present disclosure in conjunction with implementations and is not to be construed as limiting embodiments of the present application. For those having ordinary skill in the art to which the present application pertains, simple deductions or substitutions may be made without departing from the concept of the present application and are considered to fall within the scope of the present application.

What is claimed is:

1. A configuration signaling execution control method, comprising:
   in a beam recovery process and in a case of receiving configuration signaling, deciding an execution environment of the configuration signaling; and
   determining an execution policy of the configuration signaling according to a decision result;
   wherein deciding the execution environment of the configuration signaling comprises at least one of the following decisions:
   decision one: in a case where it is determined that the configuration signaling comprises band width part (BWP) handover signaling, and the BWP handover signaling is received through a normal control resource set, deciding one of the following: whether a receiving time point of the BWP handover signaling is before beam information reporting in the beam recovery process, or whether a receiving time point of the BWP handover signaling is before beam selection in the beam recovery process is completed;

decision two: in a case where it is determined that the configuration signaling comprises BWP handover signaling, and the BWP handover signaling is received during a beam recovery response detection period in the beam recovery process, deciding whether the BWP handover signaling is received through a normal control resource set or a beam failure recovery control resource set;

decision three: in a case where it is determined that the configuration signaling comprises BWP handover signaling, deciding whether the BWP handover signaling comprises target resource configuration information;

decision four: in a case where it is determined that the configuration signaling comprises higher-layer configuration signaling, and the higher-layer configuration signaling is received through a normal control resource set, deciding a receiving time point of the higher-layer configuration signaling; or decision five: in a case where it is determined that the configuration signaling comprises higher-layer configuration signaling, and the higher-layer configuration signaling is received during a beam recovery response detection period in the beam recovery process, deciding whether the higher-layer configuration signaling is received through a normal control resource set or a beam failure recovery control resource set.

2. The method of claim 1, wherein in a case where deciding the execution environment of the configuration signaling comprises the decision one, determining the execution policy of the configuration signaling according to the decision result comprises:

in a case where the decision result is that the receiving time point is before beam information reporting in the beam recovery process, determining that the execution policy of the configuration signaling is one of executing the BWP handover signaling, or executing the BWP handover signaling in a case where a first condition is satisfied; or in a case where the decision result is that the receiving time point is not before beam information reporting in the beam recovery process, determining that the execution policy of the configuration signaling is one of refusing to execute the BWP handover signaling, or executing the BWP handover signaling in a case where a second condition is satisfied; or in a case where the decision result is that the receiving time point is before beam selection in the beam recovery process is completed, determining that the execution policy of the configuration signaling is one of executing the BWP handover signaling, or executing the BWP handover signaling in a case where a third condition is satisfied; or in a case where the decision result is that the receiving time point is not before beam selection in the beam recovery process is completed, determining that the execution policy of the configuration signaling is one of refusing to execute the BWP handover signaling, or executing the BWP handover signaling in a case where a fourth condition is satisfied.

3. The method of claim 2, after executing a BWP handover according to the determined execution policy of the configuration signaling, further comprising one of the following:

re-performing beam monitoring, and determining, according to a monitoring result, whether to perform beam selection on a BWP after the BWP handover;

determining, according to a beam monitoring result obtained before the BWP handover, whether to perform beam selection on a BWP after the BWP handover; or performing beam information reporting according to a beam selection result obtained before the BWP handover.

4. The method of claim 2, wherein at least one of the first condition, the second condition, the third condition or the fourth condition comprises that:

the BWP handover signaling comprises target resource configuration information, and the target resource configuration information comprises at least one of: reference signal resource configuration information of a target BWP, PRACH resource configuration information of a target BWP or control channel configuration information of a target BWP.

5. The method of claim 1, wherein in a case where deciding the execution environment of the configuration signaling comprises the decision two, determining the execution policy of the configuration signaling according to the decision result comprises:

in a case where the decision result is that the BWP handover signaling is received through the normal control resource set, determining that the execution policy of the configuration signaling is one of refusing to execute the BWP handover signaling, or executing the BWP handover signaling in a case where a fifth condition is satisfied; or in a case where the decision result is that the BWP handover signaling is received through the beam failure recovery control resource set, determining that the execution policy of the configuration signaling is one of executing the BWP handover signaling, or executing the BWP handover signaling in a case where a sixth condition is satisfied.

6. The method of claim 5, wherein at least one of the fifth condition or the sixth condition comprises that:

the BWP handover signaling comprises target resource configuration information, and the target resource configuration information comprises at least one of: reference signal resource configuration information of a target BWP, PRACH resource configuration information of a target BWP or control channel configuration information of a target BWP.

7. The method of claim 1, wherein in a case where deciding the execution environment of the configuration signaling comprises the decision three, determining the execution policy of the configuration signaling according to the decision result comprises:

in a case where the decision result is that the BWP handover signaling comprises the target resource configuration information, determining that the execution policy of the configuration signaling is executing the BWP handover signaling.

8. The method of claim 1, wherein in a case where deciding the execution environment of the configuration signaling comprises the decision three, the target resource configuration information comprises at least one of: reference signal resource configuration information of a target BWP, physical random access channel (PRACH) resource configuration information of a target BWP or control channel configuration information of a target BWP.

9. The method of claim 1, wherein in a case where deciding the execution environment of the configuration signaling comprises the decision four, determining the execution policy of the configuration signaling according to the decision result comprises:

in a case where the decision result is that the receiving time point is before beam information reporting in the beam recovery process, determining that the execution policy of the configuration signaling is one of executing the higher-layer configuration signaling, or executing the higher-layer configuration signaling in a case where a seventh condition is satisfied; or in a case where the decision result is that the receiving time point is not before beam information reporting in the beam recovery process, determining that the execution policy of the configuration signaling is one of refusing to execute the higher-layer configuration signaling, or executing the higher-layer configuration signaling in a case where an eighth condition is satisfied; or in a case where the decision result is that the receiving time point is before beam selection in the beam recovery process is completed, determining that the execution policy of the configuration signaling is one of executing the higher-layer configuration signaling, or executing the higher-layer configuration signaling in a case where a ninth condition is satisfied; or in a case where the decision result is that the receiving time point is not before beam selection in the beam recovery process is completed, determining that the execution policy of the configuration signaling is one of refusing to execute the higher-layer configuration signaling, or executing the higher-layer configuration signaling in a case where a tenth condition is satisfied.

10. The method of claim 1, wherein in a case where deciding the execution environment of the configuration signaling comprises the decision five, determining the execution policy of the configuration signaling according to the decision result comprises:

in a case where the decision result is that BWP handover signaling is received through a normal control resource set, determining that the execution policy of the configuration signaling is one of refusing to execute the higher-layer configuration signaling, or executing the higher-layer configuration signaling in a case where an eleventh condition is satisfied; or in a case where the decision result is that BWP handover signaling is received through a beam failure recovery control resource set, determining that the execution policy of the configuration signaling is one of executing the higher-layer configuration signaling, or executing the higher-layer configuration signaling in a case where a twelfth condition is satisfied.

11. The method of claim 1, wherein the higher-layer configuration signaling comprises at least one of: control channel reconfiguration signaling, search space reconfiguration signaling or control channel transmission configuration indication (TCI) indication signaling.

12. A user equipment, comprising a processor, a memory and a communication bus;
wherein the communication bus is configured to connect the processor and the memory; and
the processor is configured to execute a computer program stored in the memory to implement the configuration signaling execution control method of claim 1.

13. A non-transitory computer-readable storage medium storing at least one computer program, wherein the at least one computer program is executable by at least one processor to implement the configuration signaling execution control method of claim 1.

14. A communication system, comprising a base station and a user equipment, wherein the base station is configured to send configuration signaling to the user equipment;
the user equipment is configured to process the configuration signaling according to the configuration signaling execution control method of claim 1.

15. A configuration signaling execution control apparatus, comprising:
a detection module, which is configured to: in a beam recovery process and in a case of receiving configuration signaling, decide an execution environment of the configuration signaling; and
a processing module, which is configured to determine an execution policy of the configuration signaling according to a decision result of the detection module;
wherein the detection module is configured to perform at least one of the following decisions:
decision one: in a case where it is determined that the configuration signaling comprises band width part (BWP) handover signaling, and the BWP handover signaling is received through a normal control resource set, deciding one of the following: whether a receiving time point of the BWP handover signaling is before beam information reporting in the beam recovery process, or whether a receiving time point of the BWP handover signaling is before beam selection in the beam recovery process is completed;
decision two: in a case where it is determined that the configuration signaling comprises BWP handover signaling, and the BWP handover signaling is received during a beam recovery response detection period in the beam recovery process, deciding whether the BWP handover signaling is received through a normal control resource set or a beam failure recovery control resource set;
decision three: in a case where it is determined that the configuration signaling comprises BWP handover signaling, deciding whether the BWP handover signaling comprises target resource configuration information;
decision four: in a case where it is determined that the configuration signaling comprises higher-layer configuration signaling, and the higher-layer configuration signaling is received through a normal control resource set, deciding a receiving time point of the higher-layer configuration signaling; or
decision five: in a case where it is determined that the configuration signaling comprises higher-layer configuration signaling, and the higher-layer configuration signaling is received during a beam recovery response detection period in the beam recovery process, deciding whether the higher-layer configuration signaling is received through a normal control resource set or a beam failure recovery control resource set.

* * * * *